United States Patent

[11] 3,628,114

[72] Inventor Tamas I. Pattantyus
 Pittsburgh, Pa.
[21] Appl. No. 873,568
[22] Filed Nov. 3, 1969
[45] Patented Dec. 14, 1971
[73] Assignee Westinghouse Electric Corporation
 Pittsburgh, Pa.

[54] SYNC ACQUISITION SYSTEM
 6 Claims, 3 Drawing Figs.
[52] U.S. Cl. .................................................... 318/314,
 307/233
[51] Int. Cl. ...................................................... H02p 5/16
[50] Field of Search .......................................... 318/175,
 176, 314, 318, 341; 307/233, 271, 295

[56] References Cited
 UNITED STATES PATENTS
3,356,921 12/1967 Bradford et al. .............. 318/318

3,361,949 1/1968 Brown et al. .................. 318/314

Primary Examiner—Oris L. Rader
Assistant Examiner—Thomas Langer
Attorneys—F. H. Henson, C. F. Renz and A. S. Oddi ABSTRACT: A sync acquisition system for synchronizing a controlled element, such as a motor or a voltage-controlled oscillator, with a reference frequency wherein the feedback frequency derived from the controlled element is compared with the reference frequency for providing outputs for accelerating or braking the controlled element in response to the comparison and also providing an output indicative of the phase difference between the reference and feedback frequencies so that when the controlled element is near enough to the synchronous state it is locked to the reference in response to the absence of accelerate or brake output for a predetermined time.

INVENTOR
Tomas I. Pottantyus
BY
ATTORNEY

SYNC ACQUISITION SYSTEM

BACKGROUND OF THE INVENTION

1. Field of the Invention

The present invention relates to sync acquisition systems and, more particularly, to such systems for synchronizing a controlled element to a reference source at the frequency of the reference source.

2. Discussion of the Prior Art

In various systems control applications, it is necessary that a controlled element, such as a motor or a voltage-controlled oscillator, provides an output at a predetermined frequency as determined by a synchronizing reference source and also that a feedback output derived from the controlled element be held in a known phase relationship with respect to the reference source. A problem associated with the phase lock loops is to bring the controlled element into synchronism with the reference source frequency from an asynchronous state. Typically the phase detector output does not give an indication as to whether the controlled element is operating at a higher or lower frequency than the reference frequency which may result in control being lost over the controlled element in the asynchronous case. Additionally no indication may be given when the controlled element is near enough to the synchronous state to permit a lock on to take place with the synchronizing reference. The system of the present invention solves the foregoing problems.

SUMMARY OF THE INVENTION

Broadly, the present invention provides a sync acquisition system wherein a controlled element is brought into synchronism with a reference frequency with an indication being given of whether the controlled element is operating at a higher or lower frequency and correcting for this difference from the reference frequency and causing the controlled element to be locked onto the reference frequency when the frequency difference between the reference frequency and the operating frequency of the controlled element is small enough to permit synchronization therebetween.

DESCRIPTION OF THE PREFERRED EMBODIMENT

Figure 1:
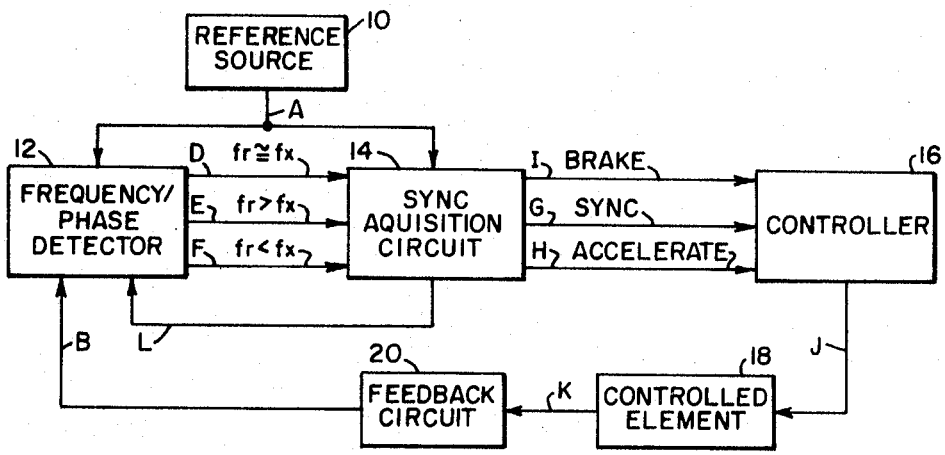
FIG. 1 is a block diagram of the sync acquisition system of the present invention.
Figure 2:
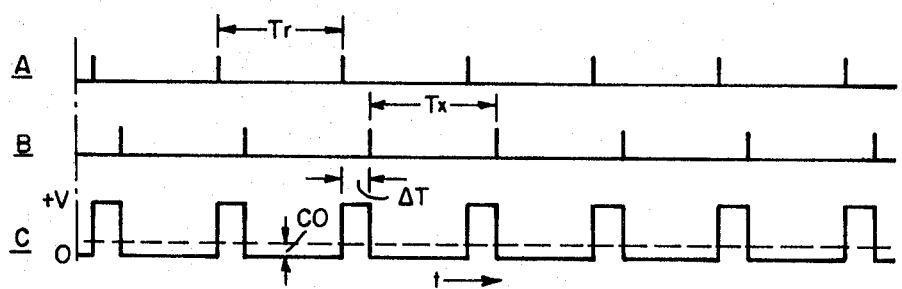
FIG. 2 is a waveform diagram utilized in explaining the operation of FIGS. 1 and 3.

Referring to FIG. 1 a generalized block diagram of the sync acquisition system is shown wherein a reference source 10 is provided which supplies output signals having a reference frequency such as shown in curve A of FIG. 2. The reference source 10 may, for example, comprise a crystal-controlled oscillator or a standard 60 Hz. line voltage output where the reference oscillator or line voltage output is amplitude limited and differentiated and rectified to provide the short time duration pulses having a frequency $fr$ and a period $Tr$ as shown in curve A of FIG. 2. Of course other types of reference sources could be utilized for providing the reference output A.

The reference output A is supplied to a frequency/phase detector 12 where it is compared with a feedback output B having an unknown frequency $fx$ and a waveform such as shown in curve B of FIG. 2. The frequency/phase detector 12 provides one of three outputs D, E, or F depending upon the comparison of the reference frequency $fx$ and the unknown frequency $fx$. If the frequencies $fr$ and $fx$ are substantially equal and in a desired phase relationship with respect to each other an output D is provided. If the reference frequency $fr$ is higher than the feedback frequency $fx$, the output E is provided, and if the reference frequency $fr$ is smaller than the feedback frequency $fx$, the output F is provided.

The outputs D, E, and F from the frequency/phase detector 12 are respectively applied to a sync acquisition circuit 14 along with the reference output A. In response to the A, D, E, and F inputs, the sync acquisition circuit 14 provides one of three outputs G, H, or I to a controller 16. If the output D is supplied as an input to the sync acquisition circuit 14, the output G is supplied to the controller 16 which is indicative of a synchronous condition between the reference source 10 and a controlled element 18 which is supplied by the controller 16. That is, the synchronous output G is indicative that the reference frequency $fr$ and the feedback frequency $fx$ are substantially equal in frequency and have a predetermined phase relationship therebetween. The sync acquisition circuit 14 provides an H output in response to an E-input thereto which will be termed herein an "accelerate" output which will cause the feedback frequency $fx$ to be increased. In response to the F-input, the sync acquisitions circuit 14 supplies an I-output which will be termed herein a "brake" output which will cause the feedback frequency $fx$ to be decreased.

In response to the G, H, or I input thereto the controller 16 provides an output J which may comprise DC output signals corresponding to either a synchronous, an accelerate, or a brake condition inputted thereto which is supplied to the controlled element 18 for determining the operating frequency thereof. The controller 16 may take the form of a digital-to-analog converter, for example, such as shown in U.S. Pat. No. 3,441,342. The controlled element 18 may for example comprise a DC motor whose rotor is driven at a speed as determined by the DC input thereto or may comprise a voltage-responsive oscillator whose output frequency is determined by the magnitude of direct voltage supplied thereto. Hence, if the sync input G is supplied to the controller 16 the output J of the controller will cause the controller element 18 to operate at its desired synchronous speed. However, if the accelerate input H or the brake input I are applied, the output J of the controller 16 will cause the controlled element 18 to increase in operating speed (frequency) or decrease in operating speed (frequency), respectively, in response thereto.

The output K of the controlled element 18, which is indicative of the operating frequency thereof, and which for example might comprise the mechanical angular velocity output of the rotor in the case of a motor or the electrical output of an oscillator. The output K is supplied to a feedback circuit 20 which in response thereto provides the feedback output B the frequency of which ($fx$) is proportional to the velocity or frequency of the controlled element 18 and having an electrical form such as shown in curve B of FIG. 2.

For example, the controlled element 18 may comprise a DC motor which is driving a magnetic recording disc where the recording disc has recorded thereon a synchronizing track having a predetermined number of pulses within one disc revolution. The synchronizing track is sensed by a playback head which provides an electrical output the frequency of which is directly proportional to the angular velocity of the motor shaft. This output is then provided to a feedback circuit 20 which may include a divider for dividing the K-input down to the feedback frequency $fx$ which is to be compared with the reference frequency $fr$. Also, the feedback circuit 20 may further process the input thereto to amplitude limit and differentiate and rectify and thereby provide the short time width pulses as shown in curve B of FIG. 2 having a period $Tx$.

For the purpose of explanation, assume that the reference frequency $fr$ is larger than the feedback frequency $fx$ so that the output E is applied to the sync acquisition circuit 18. This will cause an accelerate output H to be supplied to the controller 16 which provides an output J to increase the operating frequency of the controlled element 18 thereby increasing the feedback frequency $fx$ supplied to the frequency/phase detector 12. If the reference frequency $fr$ should be lower than the feedback frequency $fx$, and output F is provided by the frequency/phase detector 12 which causes the sync acquisitions circuit 14 to supply a brake output I to the controller 16 which accordingly provides an output J to lower the operating frequency of the controlled element 18. Whenever the output E or F is supplied to the sync acquisition circuit 14, an inhibit output L is provided therefrom which prohibits the D output from being supplied by the frequency/phase detector 12. Whenever the feedback frequency $fx$ and the reference frequency $fr$ are substantially equal and in a desired phase relationship, the inhibit signal L is removed from the frequency/phase detector 12 and the D-output is provided by the detector 12 to the sync acquisition circuit 14 which supplies the sync output G to the controller 16. In response thereto the controller 16 provides an output J to the controlled element 18 thereby locking on the controlled element 18 to the reference frequency $fr$ and indicating that an in-frequency and in-phase condition exists between reference source 10 and permitting the controlled element 18 to be driven directly therefrom.

Figure 3:
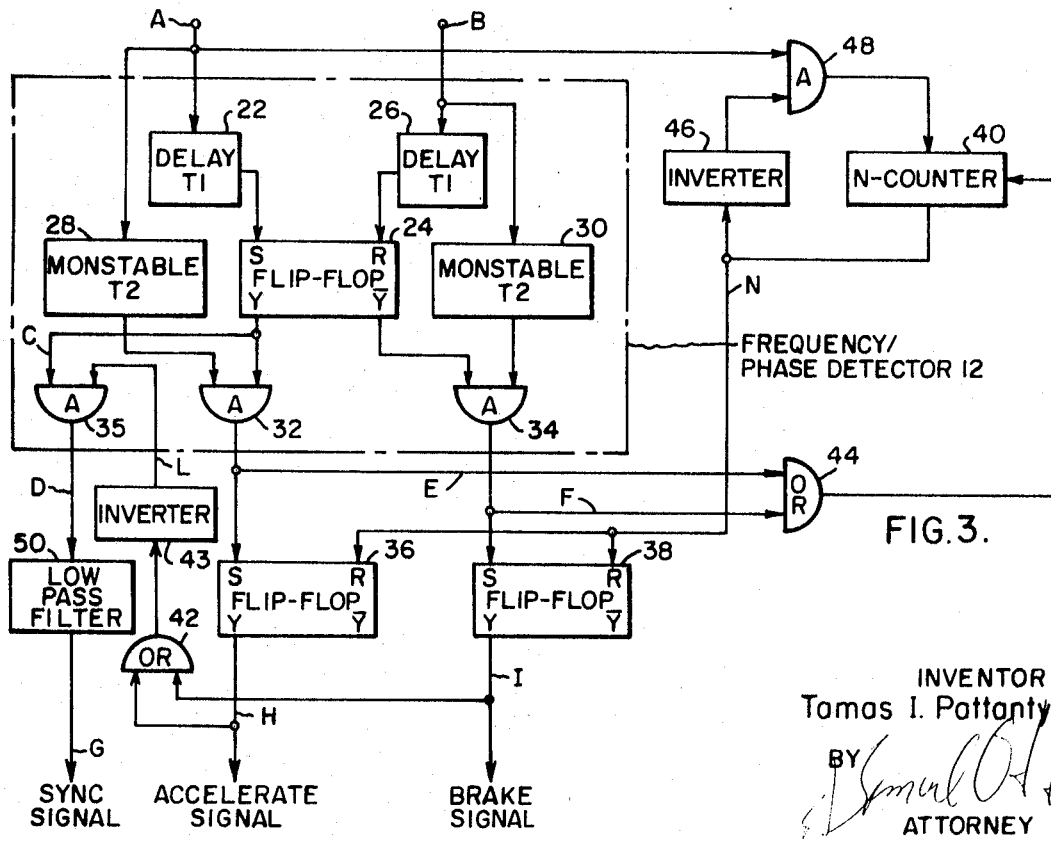
FIG. 3 is a more detailed blocked diagram of a portion of FIG. 1.

FIG. 3 shows the frequency/phase detector 12 and sync acquisition circuit 14 in a more detailed block form. The frequency/phase detector 12 will only be discussed herein in limited details since it is fully disclosed in copending application Ser. No. 869,268, filed Oct. 24, 1969, by the same inventor and assigned to the same assignee. However, for the purpose of aiding in understanding the present invention, the elements shown within the dashed-line block 12 of FIG. 3 will be briefly described therein.

The reference frequency output A is applied to a delay element 22 having a time delay Tl and after the time delay Tl is applied to the set input of a flip-flop 24. The feedback output B is provided to a delay element 26 also having a time delay Tl wherein the B signals are applied to the reset input of the flip-flop 24 after the time delay Tl. The outputs A and B are also, respectively, applied to monostable elements 28 and 30, with the monostable elements 28 and 30 providing monostable outputs of a time duration T2 which is selected to be less than the time delay Tl of the delay elements 22 and 26. The Y output of the flip-flop 24 and the monostable output of the monostable 28 are applied to an AND-logic element 32. The complementary output $\overline{Y}$ of the flip-flop 24 is applied to an AND-element 32 along with the monostable output of the monostable 30. The output of the AND 32 comprises the output E as defined in FIG. 1 and the output of the AND 34 defines the output F as shown in FIG. 1. The flip-flop 24 is a bistable element which changes output stages in response to the sequential application of ONE logic inputs to the set and reset inputs thereto. Thus in response to a ONE logic input applied to the reset input a ZERO is provided at the Y-output and a ONE at the complementary $\overline{Y}$ output. If a ONE then appears at the set input of the flip-flop 24, the output states will change with the Y-output becoming a ONE and the $\overline{Y}$-output becoming a ZERO. However other ONE inputs being provided to the set input will not cause the output states to change until a ONE reset input is provided thereto.

Assuming that the reference frequency $fr$ is higher than the feedback frequency $fx$, a condition will exist when two reference frequency pulses will occur during the time between two successive feedback pulses. Under these conditions the monostable 28 will provide a ONE output to the AND 32 in response to the second occurring reference frequency pulse when at that time the flip-flop 24 will also be supplying a ONE output to the AND 32 from the Y-output, with the second occurring reference pulse not affecting the output state of the flip-flop 24. Thus, the AND 32 will supply a ONE output signal E in response to the coincidence of the ONE inputs supplied thereto. Conversely, if the feedback frequency $fx$ is higher than the reference signal $fr$, a condition will occur when two feedback pulses will occur in the time period between two successive reference pulses. Thus, under these conditions the AND 34 will receive a ONE input from the monostable 30 in response to the second feedback pulse while the flip-flop 24 will also supply a ONE output from the $\overline{Y}$-output thereof being nonresponsive to the second feedback pulse. Thus, a ONE output F will be supplied when the feedback frequency $fx$ is larger than the reference frequency $fr$.

The detector 12 is also utilized for developing the output C which is shown in curve C of FIG. 2 which comprises a pulse waveform wherein the pulse duration $\Delta T$ provides a direct indication of the phase difference between the reference output A and the feedback output B which will be explained in more detail later.

For the purposes of explanation assume that a flip-flop 36 and a flip-flop 38, which receive respectively the set inputs from the outputs E and F of the detector 12, are in the reset condition with the Y-outputs thereof each providing a ZERO. Also assume that an N-counter 40 is at its N-count condition providing a ONE output at its N-count output N. Assume then that the feedback frequency $fx$ drops to be less than the reference frequency $fr$ and an output E is provided from the detector 12. The output E is applied to the set input of the flip-flop 36 which causes it to supply a ONE output which defines the accelerate output H as shown in FIG. 1. The accelerate output H is supplied to the controller 16 for causing the operating frequency of the controlled element 18 to be increased. The output H is also supplied to an OR-logic element 42 which supplies a ONE output in response thereto to an inverter 43 which supplied a ZERO output, which is the inhibit output L as defined above, to the AND-element 35 of the frequency/phase detector 12. The ZERO input L to the AND 35 inhibits it from supplying an output D therefrom until the ZERO input L is removed.

The E-output from the detector 12 is also supplied to an OR-element 44 which in response thereto supplies a reset input to the N-counter 40 causing the N-counter 40 to be reset to a zero count condition thereby removing the ONE output at the N-count output N. The ZERO output provided at the output N is applied to an inverter 46 so that the inverter provides a ONE input to an AND-logic element 48 unblocking it. The AND-element 48 receives the reference output A from the reference source 10 as its other input. The AND 48 will thus output a ONE pulse in response to each of the reference pulses such as shown in curve A of FIG. 2. The output of the AND 48 is supplied to the N-counter 40 which begins to count the reference pulses A. The N-counter 40, however, will be reset to a zero count each time that an output E is supplied from the detector 12 indicating that the reference frequency $fr$ is still greater than the feedback frequency $fx$.

If no frequency difference output E is provided for a time duration N-1 time periods at the reference frequency $fr$, this is an indication that the reference frequency $fr$ and the feedback frequency $fx$ are close enough for the output D of the detector 12 to be provided. Hence, when the N-counter 40 counts out to its N-count state, a ONE output is provided which is applied to the reset inputs of the flip-flops 36 and 38 causing 36 flip-flop to reset so that a ZERO output is provided at the Y-output thereof, while the flip-flop 38 is unaffected still remaining in its reset condition. Thus, the OR 42 receiving the Y-outputs of flip-flop 36 and 38 provides a ZERO output to the inverter 44 which supplies a ONE output at L to the AND 35 to provide the output with the AND 35 now being an inhibition, it may output the C-output provided by the flip-flop 24. The ONE N-count output of the N-counter 40 is also applied to the inverter 46 which supplies a ZERO to the AND 48 causing this AND to block further reference pulses A from being applied to the input of the N-counter 40. The conditions, when the feedback frequency $fx$ is greater than the reference frequency $fr$ can be described similarly, if output F is substituted for output E and flip-flop 38 is substituted for flip-flop 36 in the foregoing explanation.

The output D of the AND 35 of detector 12 is applied to a low-pass filter 50 which has a band pass selected to pass signals of zero frequency up to frequencies below the reference frequency $fr$. The output of the low-pass filter 50 is the sync signal G as defined in FIG. 1 and is utilized for supplying the controller 16 which provides a J-output therefrom for controlling the controlled element 18 which will now be locked synchronously to the reference source 10.

The output C (and also D) is shown in curve C of FIG. 2. It may be shown that the DC level of this waveform varies according to the phase difference $\Delta\Phi$ between the reference frequency $fr$ and the feedback frequency $fx$. When the reference frequency $fr$ and the feedback frequency $fx$ are the same, curve C comprises a pulse waveform having pulses of an amplitude V+ and a time duration $\Delta T$ which is indicative of the phase difference between the waveforms of curves A and B. The Fourier series representation for the waveform of curve C is given by the following expression:

$$C(t) = V\frac{\Delta T}{Tr}\left[1 + 2\sum_{n=1}\frac{\text{Sin}\left(n\pi\frac{\Delta T}{Tr}\right)}{\left(n\pi\frac{\Delta T}{Tr}\right)} \text{COS } n\left(\frac{2\pi}{Tr}t - \pi\frac{\Delta T}{Tr}\right)\right], \quad (0 \leq \Delta T \leq Tr)$$

Taking the DC term of the above equation it is found:
$C_0 = V(\Delta T/Tr) = (V/2\pi)\Delta\Phi \quad (0 \leq \Delta\Phi < 2\pi)$
By this last expression it can be seen that the DC level $C_0$ of the waveform of curve C is directly proportional to the phase difference between reference frequency $fr$ and the feedback frequency $fx$ where difference is measured in radians between the indicated ranges.

The DC level $C_0$ is shown in curve C of FIG. 2 and increases in the positive direction as the phase difference $\Delta\Phi$ between the waveforms of curves A and B increases. Hence, as the phase difference increases, the DC sync signal G applied to the controller 16 will increase causing the output of the controller to increase thereby increasing the operating frequency of the controlled element 18.

When the phase difference between the reference and feedback signals exceeds a predetermined amount, and $fr$ being greater than $fx$, the output E will be provided by the detector 12 causing the AND 35 to be inhibited and blocking a D-output being applied to the low-pass filter 50. Also the N-counter 40 will be reset and the comparison operation between the reference and feedback signal is performed as discussed above. When the reference and feedback waveforms of curves A and B, respectively, are brought back within predefined limits of phase difference, the AND 35 is again made operative to translate the C-output therethrough to the inputted as D to the low-pass filter 50 with the sync signal G then being applied to the controller 16.

Conversely, if the feedback frequency $fx$ should be higher than the reference frequency $fr$, the AND 34 is operative to provide an F-output which is utilized to inhibit the AND 35 and also to reset the N-counter 40 to instigate the comparison operation between the reference signals A and the feedback signals B. When the signals A and B are brought into frequency and phase synchronism, indicated by the termination of the F-output for the predetermined time interval set by the N-counter 40, then the AND 35 is permitted to translate the C-output through the AND 35 to the low-pass filter to provide the sync output G to the controller 16. Also the N-counter 40 is set to its N-count output N until the next E or F frequency difference output is provided via the OR 44 to reset this counter.

The flip-flop 24 which supplies the C-output thus operates as part of the frequency difference detector generating the frequency difference outputs E and F and additionally functions to provide the phase detector output C which has a DC component directly related to the phase difference between the reference A and the feedback B. By passing the phase detector output through the low-pass filter 50, the sync output G is provided. The sync output G when applied to the controller 16 provides for direct control of the controlled element 18 with a signal which is directly related to the phase difference between the reference output A and the feedback output B. If for some reason the controlled element 18 should become asynchronous, that is, the phase difference between the waveforms A and B differs by more than a predetermined amount, the sync output G is inhibited and the appropriate accelerate signal H or brake signal I is provided to bring the system back into frequency and phase synchronism with the reference source 10.

I claim as my invention:

1. In a sync acquisition system for synchronizing a controlled element with reference frequency signals, the combination of:
   first means for providing feedback frequency signals indicative of the operating frequency of said controlled element;
   second means for comparing said reference frequency signals with said feedback frequency signals and for providing a first output if said reference frequency is higher than the feedback frequency, a second output if the reference frequency is lower than the feedback frequency, and a third output indicative of the phase relationship between the reference and feedback frequencies;
   third means for providing an accelerate output for increasing the operating frequency of said controlled element in response to said first output and providing a brake output for decreasing the operating frequency of said controlled element in response to said second output;
   fourth means being rendered responsive to said reference frequency signals in response to either said first or second output and permitting said accelerate or brake output to be provided until no first or second output is provided for a predetermined time when a fourth output is provided thereby; and
   fifth means for receiving said third output and providing a sync output in response thereto indicative that said reference frequency signal and said feedback frequency signals have a desired phase relationship therebetween for causing said controlled element to be operated in response thereto in the absence of said first or second output.

2. The combination of claim 1 wherein:
   said second means includes a bistable element providing said third output at substantially the reference frequency and having a pulse width indicative of the phase relationship between said reference and feedback signal.

3. The combination of claim 2 wherein:
   said fifth means includes filter means for receiving said third output and rejecting the reference frequency and providing said sync output proportional to the phase difference between said reference and feedback signals.

4. The combination of claim 1 wherein:
   said third means includes an accelerate bistable element and a brake bistable element operative to provide respectively said accelerate and brake outputs in response to said first and second outputs until reset in response to said fourth output from said fourth means.

5. The combination of claim 1 wherein:
   said fourth means includes an N-counter operative to be reset to a predetermined count in response to said first or second output and to count to N-counts in response to said reference signals unless reset by occurrence of said first or second output prior to reaching the N-count, upon reaching the N-count said fourth output being provided to terminate the counting operation and to terminate said accelerate or brake output.

6. The combination of claim 5 wherein:
   said second means includes a bistable element providing said third output of substantially the reference frequency and having a pulse width indicative of the phase relationship between said reference and feedback signals,
   said fifth means includes filter means for receiving said third output and rejecting said reference frequency and providing said sync output proportional to the phase difference between said reference and feedback signals for controlling said controlled element under synchronized conditions.

* * * * *